(12) United States Patent
Choi et al.

(10) Patent No.: US 11,189,820 B2
(45) Date of Patent: Nov. 30, 2021

(54) METHOD FOR MANUFACTURING SECONDARY BATTERY AND SECONDARY BATTERY USING SAME

(71) Applicant: Samsung SDI Co., Ltd., Yongin-si (KR)

(72) Inventors: Jung Hyuck Choi, Yongin-si (KR); Won Shik Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 139 days.

(21) Appl. No.: 16/312,913

(22) PCT Filed: Jun. 20, 2017

(86) PCT No.: PCT/KR2017/006464
§ 371 (c)(1),
(2) Date: Dec. 21, 2018

(87) PCT Pub. No.: WO2018/004177
PCT Pub. Date: Jan. 4, 2018

(65) Prior Publication Data
US 2019/0267608 A1    Aug. 29, 2019

(30) Foreign Application Priority Data

Jun. 27, 2016 (KR) .................. 10-2016-0080099

(51) Int. Cl.
*H01M 4/04* (2006.01)
*H01M 10/0587* (2010.01)
(Continued)

(52) U.S. Cl.
CPC ........... *H01M 4/0471* (2013.01); *H01M 4/04* (2013.01); *H01M 4/64* (2013.01); *H01M 10/04* (2013.01); *H01M 10/0587* (2013.01)

(58) Field of Classification Search
CPC .... H01M 4/04; H01M 4/0404; H01M 4/0471; H01M 4/139; H01M 4/64; H01M 10/04; H01M 10/058; H01M 10/0587
See application file for complete search history.

(56) References Cited

U.S. PATENT DOCUMENTS 6,878,173 B2    4/2005 Miyahisa et al.
9,818,989 B2    11/2017 Cho et al.
(Continued)

FOREIGN PATENT DOCUMENTS

CN    101640280 A    2/2010
CN    103503216 A    1/2014
(Continued)

OTHER PUBLICATIONS

English translation of KR Publication 10-2008-0101725, Nov. 2008.*
(Continued)

*Primary Examiner* — Brittany L Raymond
(74) *Attorney, Agent, or Firm* — Lewis Roca Rothgerber Christie LLP

(57) ABSTRACT

The present invention relates to a method for manufacturing a secondary battery and a secondary battery using the same, which can improve the quality of a cut surface of an electrode plate and improve the reliability of the secondary battery. For example, disclosed is a method for manufacturing a secondary battery, the method comprising: an active material layer forming step of forming an active material layer by coating an active material on both surfaces of a collector plate; an active material layer removing step of removing a part of the active material layer by irradiating a laser beam to the both surfaces of the collector plate; and a cutting step of cutting the collector plate by irradiating a (Continued)

laser beam onto the collector plate from which the active material layer has been removed in the active material layer removing step.

9 Claims, 6 Drawing Sheets

(51) Int. Cl.
*H01M 4/64* (2006.01)
*H01M 10/04* (2006.01)

(56) References Cited

U.S. PATENT DOCUMENTS

| | | | |
|---|---|---|---|
| 9,966,592 B2 | 5/2018 | Stern et al. | |
| 2002/0182483 A1 | 12/2002 | Miyahisa et al. | |
| 2003/0215700 A1 | 11/2003 | Hosoda et al. | |
| 2004/0191613 A1 | 9/2004 | Miyahisa et al. | |
| 2004/0191620 A1 | 9/2004 | Miyahisa et al. | |
| 2006/0121341 A1 | 6/2006 | Hosoda et al. | |
| 2009/0081533 A1 | 3/2009 | Miyahisa et al. | |
| 2010/0028767 A1 | 2/2010 | Inose et al. | |
| 2013/0252086 A1* | 9/2013 | Stern | H01M 4/70 429/209 |
| 2016/0013469 A1* | 1/2016 | Tajima | H01M 4/13 429/127 |
| 2016/0036009 A1* | 2/2016 | Cho | H01M 2/30 429/179 |

FOREIGN PATENT DOCUMENTS

| | | | |
|---|---|---|---|
| CN | 105322213 A | | 2/2016 |
| JP | 2002-75345 A | | 3/2002 |
| KR | 1999-018729 A | | 3/1999 |
| KR | 2001-0007879 A | | 2/2001 |
| KR | 10-2008-0101725 | * | 11/2008 |
| KR | 10-2008-0101725 A | | 11/2008 |
| KR | 10-2012-0117636 A | | 10/2012 |
| KR | 10-2013-0016516 A | | 2/2013 |
| KR | 10-2014-0097369 A | | 8/2014 |
| KR | 10-2015-0122940 A | | 11/2015 |
| KR | 10-2016-0015013 A | | 2/2016 |

OTHER PUBLICATIONS

EPO Extended Search Report dated Dec. 20, 2019, for corresponding European Patent Application No. 17820454.1 (7 pages).
International Search Report for corresponding International Application No. PCT/KR2017/006464, dated Sep. 12, 2017, 3pp.
Chinese Office action for Application No. 201780040039.8, dated Dec. 30, 2020, 10 pages.

* cited by examiner

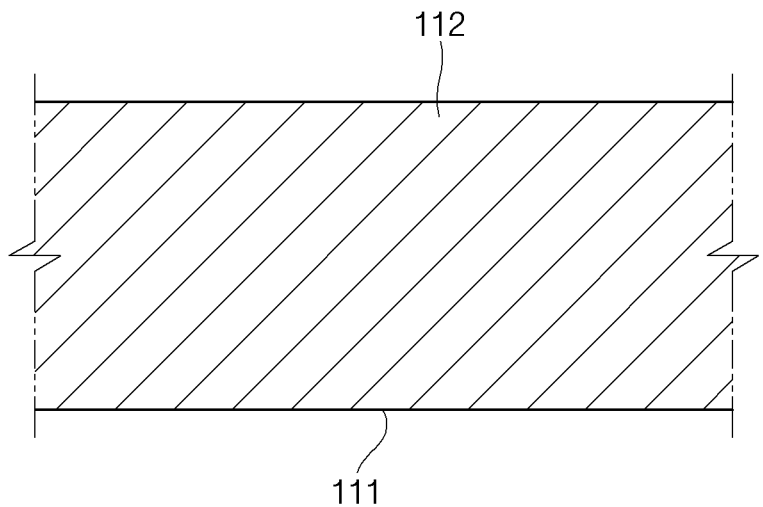
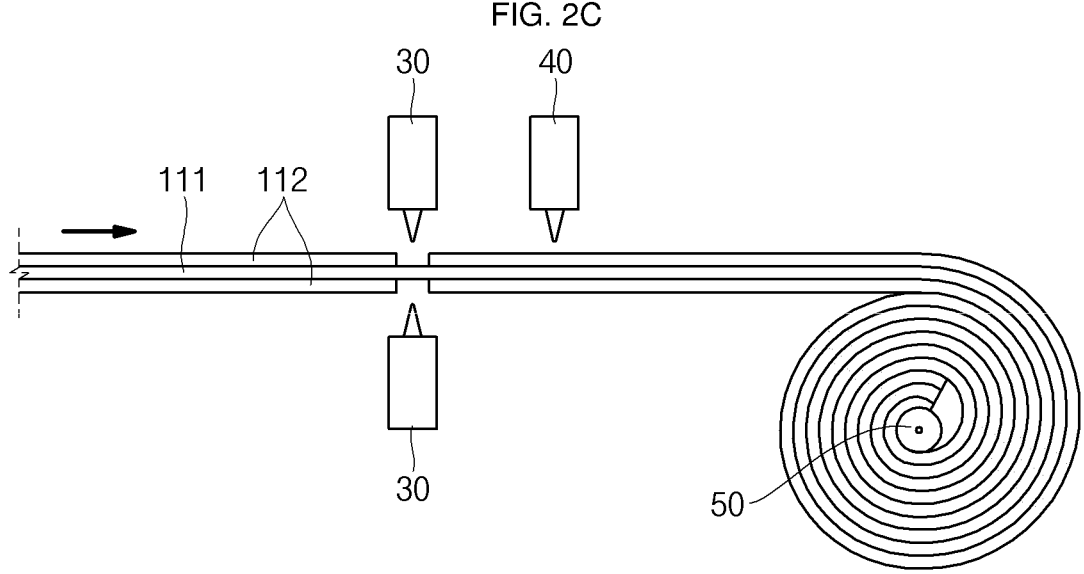

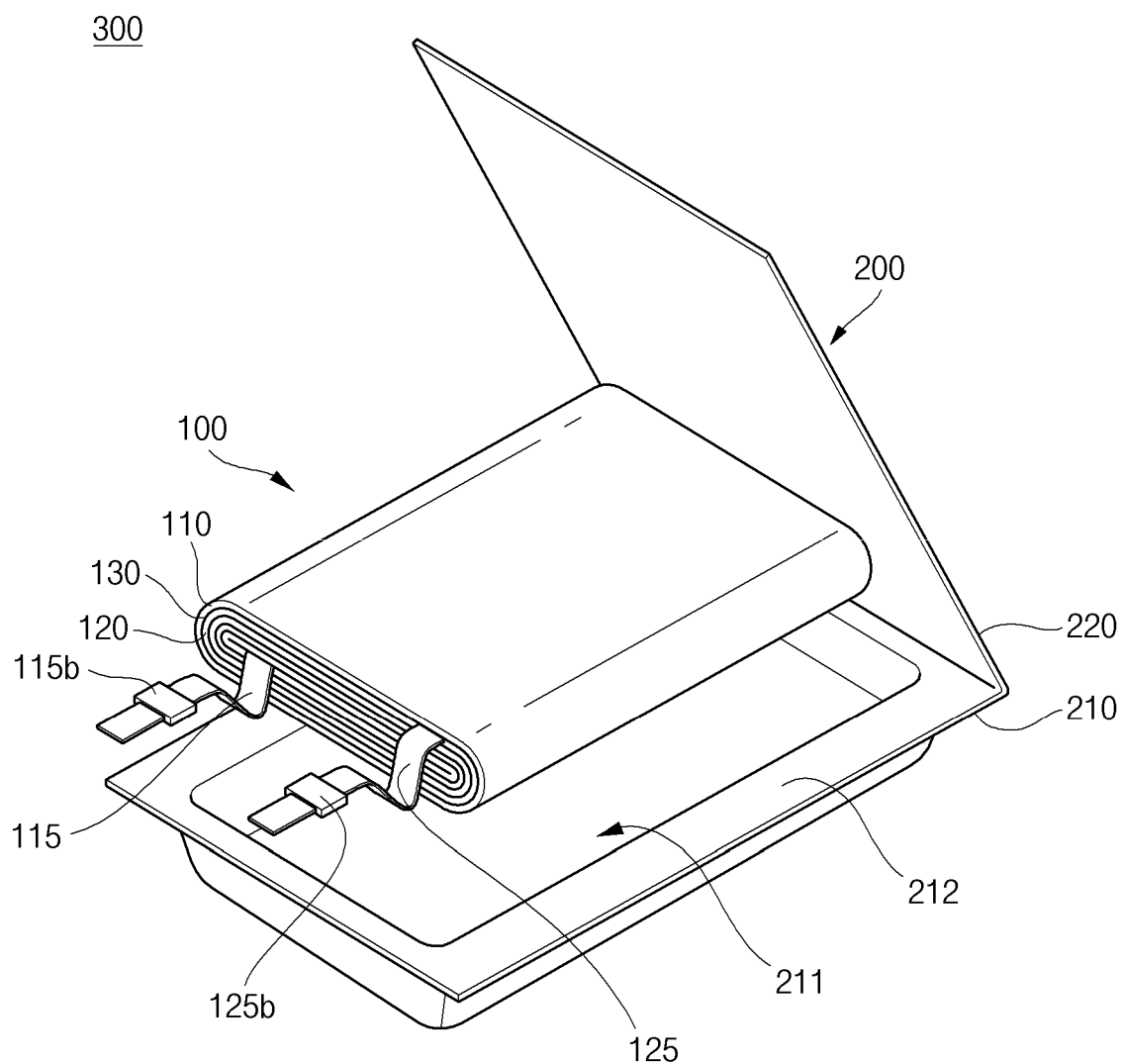

METHOD FOR MANUFACTURING SECONDARY BATTERY AND SECONDARY BATTERY USING SAME

CROSS-REFERENCE TO RELATED APPLICATION(S)

This application is a National Phase Patent Application of International Patent Application Number PCT/KR2017/006464, filed on Jun. 20, 2017, which claims priority of Korean Patent Application No. 10-2016-0080099, filed Jun. 27, 2016. The entire contents of both of which are incorporated herein by reference.

TECHNICAL FIELD

The present invention relates to a method for manufacturing a secondary battery and a secondary battery using the same.

BACKGROUND ART

In general, unlike a primary battery that cannot be charged, a secondary battery can be recharged. A low-capacity secondary battery comprised of one single cell is used as the power source for various portable small-sized electronic devices, such as cellular phones or camcorders. A high-capacity secondary battery in which several tens of cells are connected in a battery pack is used as power sources for motor drives, such as those in electric bicycles, electric scooters, hybrid vehicles or electric vehicles.

Among various components of a secondary battery, an electrode plate should be accurately cut to be suited to the size of a secondary battery to be manufactured to increase the battery capacity while reducing capacity dispersion, thereby increasing the quality of the secondary battery. In order to accurately cut the electrode plate, cutting or severing is generally performed using a mold.

However, the cutting using a mold may require frequent maintenance and repair works due to the limited life span of the mold, and the mold may have to be replaced according to a change in the product specification. In addition, from the viewpoint of quality, a cutting blade may become blunt with repeated uses of the mold, thereby deteriorating cutting quality, and a sharp and keen-edged burr may occur on the electrode plate accordingly. In addition, since an electrode plate is cut in a state in which an active material is coated on the electrode plate, the active material may be scattered in forms of particles, thereby causing a defect to the secondary battery due to contamination.

DESCRIPTION OF THE INVENTION

Technical Problems to be Solved

The present invention provides a method for manufacturing a secondary battery and a secondary battery using the same, which can improve the quality of a cut surface of an electrode plate and improve the reliability of the secondary battery.

Technical Solutions

In an exemplary embodiment of the present invention, there is provided a method for manufacturing a secondary battery, the method including an active material layer forming step of forming an active material layer by coating an active material on both surfaces of a collector plate, an active material layer removing step of removing a part of the active material layer by irradiating a laser beam to the both surfaces of the collector plate, and a cutting step of cutting the collector plate by irradiating a laser beam onto the collector plate from which the active material layer has been removed in the active material layer removing step.

The laser beam irradiated in the active material layer forming step may have a pulse width of 5 nsec to 100 nsec and peak power of 10 KW to 50 KW and may be an infrared pulse laser having an output capacity of 20 W to 200 W.

The laser beam irradiated in the cutting step may be an infrared laser having an output capacity of 300 W to 1 KW.

A bead part having a circular or oval cross-section may be formed on a cut surface of the current collector plate by fusing the current collector plate by the laser beam irradiated in the cutting step and cooling.

The bead part may have a width in the range from 1 μm to 100 μm.

A non-coating portion from which the active material has been removed may be formed between the cut surface and the active material layer by the laser beam irradiated in the active material layer removing step, and the non-coating portion may have a width of 0.1 mm to 3 mm.

In another exemplary embodiment of the present invention, there is provided a secondary battery including an electrode assembly and a case receiving the electrode assembly, wherein the electrode assembly includes an electrode plate, and the electrode plate includes a current collector plate, an active material layer formed by coating an active material on the current collector plate, and a non-coating portion formed at opposite ends in a lengthwise direction of the current collector plate, the non-coating portion from which the active material has been removed by a laser beam.

A bead part having a circular or oval cross-section may be formed on a cut surface positioned on opposite ends of the current collector plate in a lengthwise direction by fusing the current collector plate by the laser beam and cooling.

The bead part may have a width in the range from 1 μm to 100 μm.

The non-coating portion may have a width of 0.1 mm to 3 mm.

Advantageous Effects

As described above, in the method for manufacturing of the secondary battery according to an embodiment of the present invention, the current collector plate is cut after removing the active material from a portion to be cut using the laser beam, thereby increasing the quality of the cut surface by preventing contamination due to the active material and electrical short due to burrs. Accordingly, the secondary battery according to the present invention can be improved.

In addition, in the method for manufacturing of the secondary battery according to an embodiment of the present invention, the bead part similar to a circle, an ellipse or a welding bead having a uniform thickness and/or diameter is formed on the cut surface of the electrode plate to prevent the bead part from penetrating into a separator for separating electrode plates from each other, thereby suppressing occurrence of electrical shorts. Accordingly, the secondary battery according to the present invention can be improved.

BRIEF DESCRIPTION OF DRAWINGS

FIGS. 2A to 2G are cross-sectional views and plan views for explaining the method for manufacturing a secondary battery according to an embodiment of the present invention.

FIG. 3 is an exploded perspective view of a secondary battery according to an embodiment of the present invention.

BEST MODE FOR CARRYING OUT THE INVENTION

Hereinafter, a preferred embodiment of the present invention will be described in detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In the accompanying drawings, sizes or thicknesses of various components are exaggerated for brevity and clarity. Like numbers refer to like elements throughout. As used herein, the term "and/or" includes any and all combinations of one or more of the associated listed items. It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Figure 1:
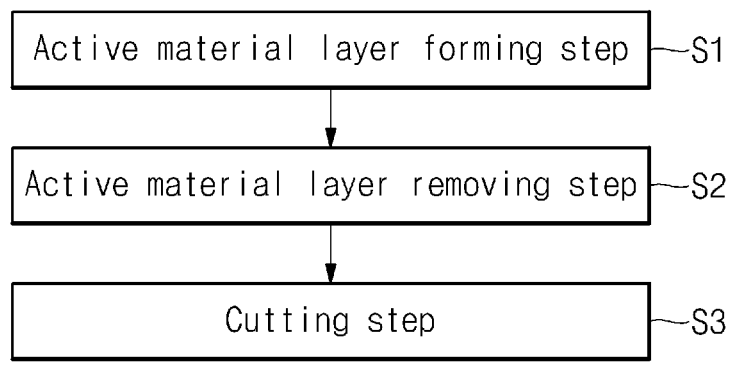
FIG. 1 is a flowchart illustrating a method for manufacturing a secondary battery according to an embodiment of the present invention.

FIG. 1 is a flowchart illustrating a method for manufacturing a secondary battery according to an embodiment of the present invention. FIGS. 2A to 2G are cross-sectional views and plan views for explaining the method for manufacturing a secondary battery according to an embodiment of the present invention.

Referring to FIG. 1, the method for manufacturing a secondary battery according to an embodiment of the present invention includes an active material layer forming step (S1), an active material layer removing step (S2) and a cutting step (S3). The method for manufacturing a secondary battery according to an embodiment of the present invention shown in FIG. 1 particularly relates to an electrode plate constituting the secondary battery. Here, the electrode plate may be, for example, a positive electrode plate, but all features of the following description can also be applied to a negative electrode plate as well.

Figure 2A:
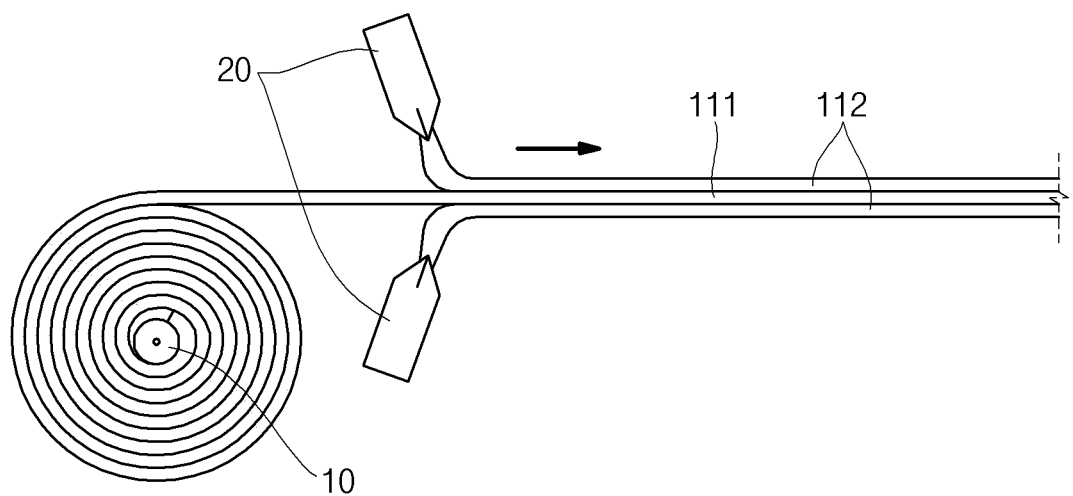

In the active material layer forming step (S1), an active material is coated on both surfaces of a current collector plate 111. As shown in FIG. 2A, in the active material layer forming step (S1), the active material is coated on both surfaces of the current collector plate 111 unwound from an unwinding roller 10 to form an active material layer 112. The active material is discharged through a slot die 20 and is uniformly coated on both surfaces of the current collector plate 111. For example, the current collector plate 111 may be formed of a metal foil made of aluminum or an aluminum alloy, or a mesh, and the active material may include a transition metal oxide.

In addition, as shown in FIG. 2B, in the active material layer forming step (S1), the active material layer 112 is continuously formed on the entire surface of the current collector plate 111. As described above, if the active material layer 112 is continuously formed on the current collector plate 111, coating productivity can be improved and battery capacity can be increased, compared to a case where the active material layer 112 is intermittently formed on the current collector plate 111. The current collector plate 111 is cut as long as required to be used by a user, which will later be described in detail.

In the active material layer removing step (S2), a portion of the active material layer 112 is removed by irradiating a laser beam to the current collector plate 111. As shown in FIG. 2C, a first laser part 30 is positioned on top and bottom surfaces of the current collector plate 111. Here, the first laser part 30 may be installed on the same line with the slot die 20 through which the active material is discharged or on a separate line, but the position of the first laser part 30 is not limited by the present invention. The first laser part 30 may include, for example, a laser oscillator for oscillating a laser beam, an expander for expanding the size of the laser beam, and a scanner focusing lens unit for scanning and focusing the laser beam on the current collector plate, but the construction of the first laser part 30 is not limited by the present invention. In addition, the laser beam may be based on pulsed waves. A general infrared (IR) laser oscillator of carbon dioxide, YAG, helium, neon, etc., may be used as the first laser part 30. However, the present invention does not limit the kind of a laser oscillator used to those listed herein.

Figure 2D:
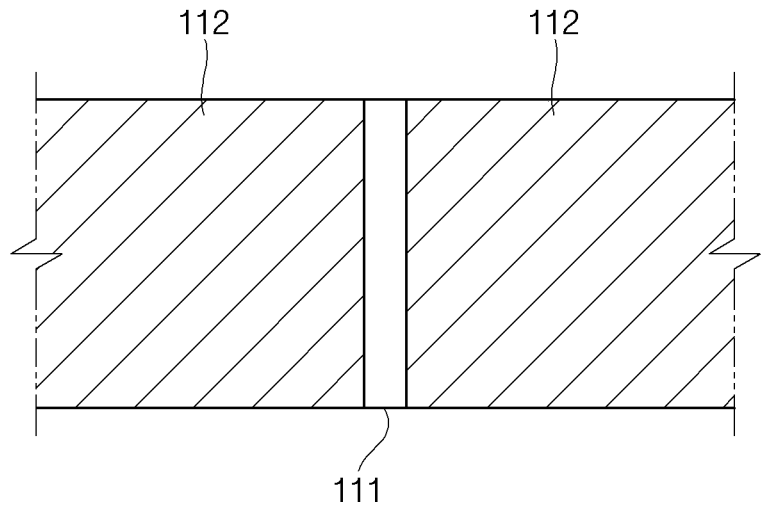

In the active material layer removing step (S2), the laser beam generated from the first laser part 30 is irradiated to the current collector plate 111 having the active material layer 112 formed thereon to remove a portion of the active material layer 112. Accordingly, portions of the active material layer 112 formed on the top and bottom surfaces of the current collector plate 111 are removed. Of course, in the active material layer removing step (S2), only the active material layer 112 formed on the top surface of the current collector plate 111 or only the active material layer 112 formed on the bottom surface of the current collector plate 111 may be removed. However, in order to improve the quality of the cut surface, both of the active material layer 112 formed on the top surface and the active material layer 112 formed on the bottom surface of the current collector plate 111 are preferably removed. As shown in FIG. 2D, in the active material layer removing step (S2), a portion of the active material layer 112 is removed in a direction perpendicular to a winding direction of the current collector plate 111. The laser beam may have a pulse width in the range from approximately 5 nsec to approximately 100 nsec, a peak power in the range from approximately 10 KW to approximately 50 KW, and an output capacity in the range from approximately 20 W to approximately 200 W. Here, if the output capacity of the laser beam is smaller than approximately 20 W, the active material layer 112 may not be perfectly removed. If the output capacity of the laser beam is greater than approximately 200 W, a portion of the current collector plate 111 as well as the active material layer 112 may be removed. In addition, the first laser part 30 may be an infrared pulse laser having a wavelength in the range from approximately 1030 nm to approximately 1080 nm. As described above, the current collector plate 111 from which the active material layer 112 has been removed may be transferred to a subsequent process by the winding roller 50.

Figure 2E:
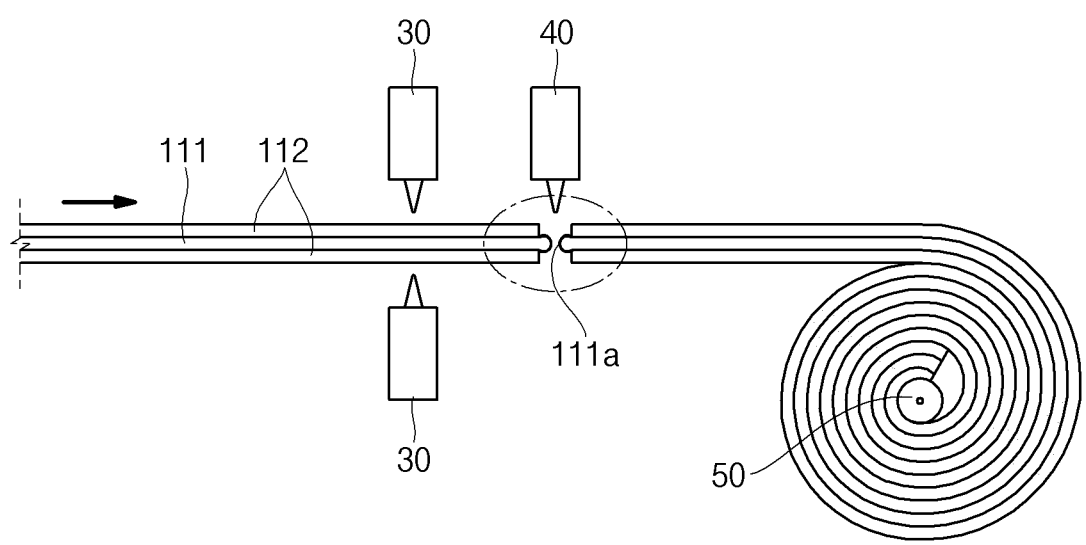
Figure 2F:
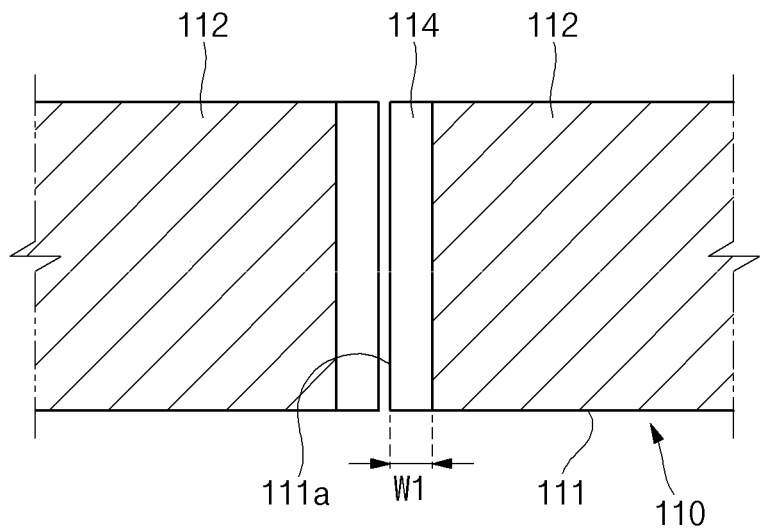

In the cutting step (S3), the current collector plate 111 is cut by irradiating a laser beam to the collector plate 111 from which the active material layer has been removed in the active material layer removing step (S2). As shown in FIG. 2E, a second laser part 40 is positioned on the current collector plate 111. The second laser part 40 may be based on continuous waves. To this end, a diode or semiconductor pump single mode continuous wave laser oscillator may be used. Additionally, a general infrared (IR) laser oscillator of carbon dioxide, YAG, helium, neon, etc., may be used as the second laser part 40. However, the present invention does not limit the kind of a laser oscillator used to those listed herein. In addition, the second laser part 40 is positioned on the same line with the first laser part 30. Therefore, if the current collector plate 111 from which the active material layer has been removed by the first laser part 30 is transferred to a position of the second laser part 40 by the winding roller 50, as shown in FIGS. 2E and 2F, the second laser part 40 irradiates a laser beam to cut the current collector plate 111. Accordingly, the manufacture of the electrode plate 110 (positive electrode plate) is completed.

In general, an electrode plate is cut as long as required using a mold in a state in which an active material is coated on the electrode plate. Here, the active material in a cutting region is scattered in forms of particles, a defect may be caused due to contamination. In addition, a burr may occur to the cut surface with the use of the mold, thereby resulting in an electrical short between electrode plates. In the present invention, however, the active material in the cutting region is first removed and the electrode plate is then cut using a laser beam, thereby preventing contamination due to the active material and an electrical short due to the burr, consequently improving the quality of the cut surface.

The laser beam may have an output capacity of 300 W to 1 KW. Here, if the output capacity of the laser beam is smaller than 300 W, the current collector plate 111 may not be properly cut. In addition, even if the output capacity of the laser beam is greater than 1 KW, cutting quality is not further improved. In addition, the laser beam irradiated from the second laser part 40 may be an infrared pulse laser having a wavelength in the range from approximately 1030 nm to approximately 1080 nm.

In addition, as shown in FIG. 2F, the cut surface 111a of the current collector plate 111 cut by a laser beam generated from the second laser part 40 is approximately 0.1 mm to approximately 3 mm from the active material layer 112. That is to say, the non-coating portion 114 from which the active material has been removed by the first laser part 30 is formed between the cut surface 111a and the active material layer 112 to have a width W1 in the range from approximately 0.1 mm to approximately 3 mm. Here, if the width W1 of the non-coating portion 114 is smaller than 0.1 mm, a portion of the current collector plate 111 having the active material layer 112 formed thereon may be fused by the laser beam when the cut surface 111a is formed by cutting the current collector plate 111. In addition, if the width W1 of the non-coating portion 114 is greater than 3 mm, suggesting that the active material has been excessively removed, the capacity of the secondary battery per unit area may become lowered.

Figure 2G:
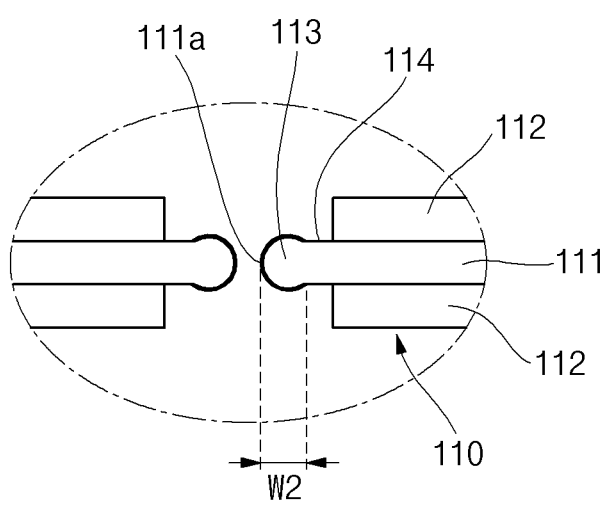

In addition, as shown in FIG. 2G, a bead part 113 is formed on the cut surface 111a. The bead part 113 may be a kind of dross formed due to the fusing of the current collector plate 111 when the current collector plate 111 is fused by the laser beam. As described above, since the bead part 113 is formed from the current collector plate 111 fused by the laser beam and cooled, it may have a roughly circular cross-section due to surface tension. That is to say, the bead part 113 may have a roughly circular and/or oval cross-section perpendicular to a lengthwise direction of the current collector plate 111.

The bead part 113 may be formed to have a width W2 in the range from approximately 1 μm to approximately 100 μm, preferably in the range from approximately 30 μm to approximately 40 μm. Here, it is quite difficult to make the width W2 of the bead part 113 smaller than approximately 1 μm due to characteristics of the manufacturing process. However, the width W2 of the bead part 113 can be controlled to be smaller than approximately 100 μm by adjusting the output capacity of the laser beam.

As described above, in the method for manufacturing of the secondary battery according to an embodiment of the present invention, since the current collector plate 111 is cut after removing the active material from a portion to be cut using the laser beam, contamination due to the active material and electrical short due to burrs can be prevented, thereby increasing the quality of the cut surface 111a. Accordingly, the secondary battery according to the present invention can be improved.

In addition, in the method for manufacturing of the secondary battery according to an embodiment of the present invention, since the bead part 113 similar to a circle, an ellipse or a welding bead having a uniform thickness and/or diameter is formed on the cut surface 111a, the bead part 113 can be prevented from penetrating into a separator for separating electrode plates from each other, thereby suppressing occurrence of electrical shorts. Moreover, since the bead part 113 is formed to have a substantially round surface, it is possible to prevent the separator from being torn or damaged by the bead part 113 even with a direct contact between the bead part 113 and the separator.

Hereinafter, a secondary battery using the electrode plate 110 manufactured in the above-described method will be described. The aforementioned electrode plate 110 will be defined as a first electrode plate (i.e., a positive electrode plate). In addition, since a second electrode plate (i.e., a negative electrode plate) having a polarity opposite to the first electrode plate 110 is manufactured by the same method as described above, a description thereof will not be given.

Figure 4:
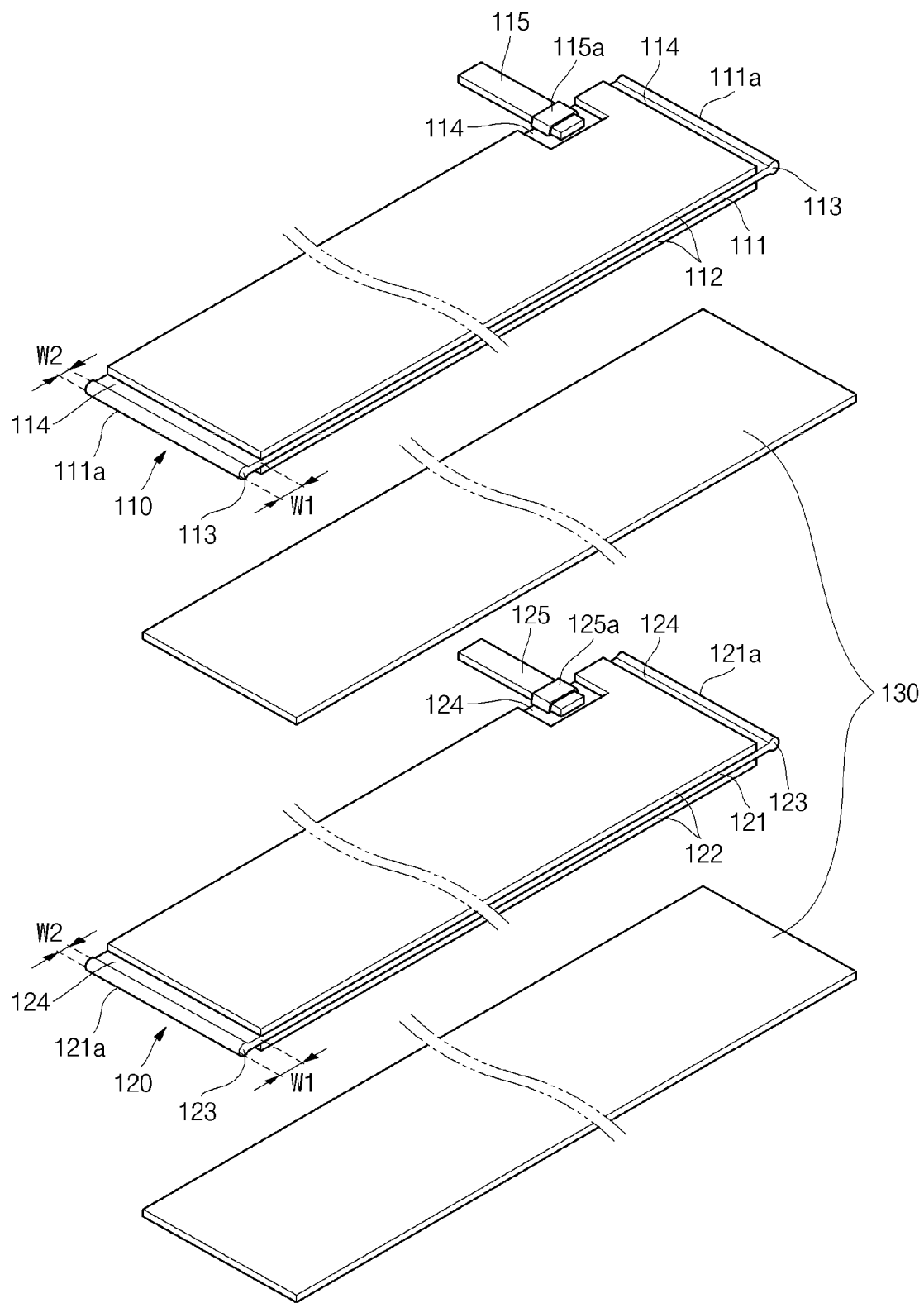
FIG. 4 is an exploded perspective view of an electrode assembly.

FIG. 3 is an exploded perspective view of a secondary battery according to an embodiment of the present invention. FIG. 4 is an exploded perspective view of an electrode assembly.

Referring to FIGS. 3 and 4, the secondary 300 battery according to an embodiment of the present invention may include an electrode assembly 100 and a pouch 200.

The electrode assembly 100 includes a first electrode plate 110, a second electrode plate 120 and a separator 130 interposed between the first electrode plate 110 and the second electrode plate 120. The electrode assembly 100 is configured such that a stacked structure of the first electrode plate 110, the second electrode plate 120 and the separator 130 is wound in a jelly-roll configuration. Here, the first electrode plate 110 may function as a positive electrode and the second electrode plate 120 may function as a negative electrode.

The first electrode plate 110 includes a first current collector plate 111 formed of a metal foil or mesh made of, for example, aluminum or an aluminum alloy, a first active material layer 112 formed by coating a first active material, such as a transition metal oxide, on the first current collector plate 111, and a first non-coating portion 114 on which the first active material is not coated. In addition, the first electrode plate 110 includes a cut surface 111a formed at opposite ends in a lengthwise direction of the first current collector plate 111, and a bead part 113 formed on the cut surface 111a.

The cut surface 111a is a surface cut by a laser beam to form the first electrode plate 110. As described above, since the bead part 113 is formed by fusing the first current collector plate 111 by the laser beam and then being cooled, a cross-sectional shape of the bead part 113 may be roughly circular due to surface tension. That is to say, the bead part 113 may have a roughly circular and/or oval cross-section perpendicular to the lengthwise direction of the first current collector plate 111. In addition, the bead part 113 may have a greater thickness than the first current collector plate 111. In addition, the bead part 113 may be formed to have a width W2 in the range from approximately 1 µm to approximately 100 µm, preferably in the range from approximately 30 µm to approximately 40 µm. Here, it is quite difficult to make the width W2 of the bead part 113 smaller than approximately 1 µm due to characteristics of the manufacturing process. However, the width W2 of the bead part 113 can be controlled to be smaller than approximately 100 µm by adjusting the output capacity of the laser beam.

The first non-coating portion 114 is formed at opposite sides in the lengthwise direction of the first current collector plate 111. That is to say, the first non-coating portion 114 is positioned between the cut surface 111a and the first active material layer 112. The width W1 of the first non-coating portion 114 is in the range from approximately 0.1 mm to approximately 3 mm. Here, if the width W1 of the first non-coating portion 114 is smaller than 0.1 mm, a portion of the first current collector plate 111 having the active material layer 112 formed thereon may be fused by the laser beam when the cut surface 111a is formed by cutting the first current collector plate 111. In addition, if the width W1 of the first non-coating portion 114 is greater than 3 mm, suggesting that the active material has been excessively removed, the capacity of the secondary battery per unit area may become lowered.

In addition, the first non-coating portion 114 is further formed at one side perpendicular to the lengthwise direction of the first current collector plate 111, and a first electrode tab 115 is attached to the first non-coating portion 114. The first electrode tab 115 may be attached to the first non-coating portion 114 using an adhesive member 115a. In addition, the first non-coating portion 114 having the first electrode tab 115 attached thereto may be formed by removing a portion of the first active material layer 112 formed on the first current collector plate 111. Of course, the first non-coating portion 114 may also be formed by not coating the active material on the one side perpendicular to the lengthwise direction of the first current collector plate 111 when the first electrode plate 110 is formed. In this case, the first non-coating portion itself may serve as a first electrode tab.

The second electrode plate 120 includes a second current collector plate 121 formed of a metal foil or mesh made of, for example, copper, a copper alloy, nickel or a nickel alloy, a second active material layer 122 formed by coating a second active material, such as graphite or carbon, on the second current collector plate 121, and a second non-coating portion 124 on which the second active material is not coated. In addition, the second electrode plate 120 includes a cut surface 121a formed at opposite ends in a lengthwise direction of the second current collector plate 121, and a bead part 123 formed on the cut surface 121a.

The cut surface 121a is a surface cut by a laser beam to form the second electrode plate 120. As described above, since the bead part 123 is formed by fusing the second current collector plate 121 by the laser beam and then being cooled, a cross-sectional shape of the bead part 123 may be roughly circular due to surface tension. That is to say, the bead part 123 may have a roughly circular and/or oval cross-section perpendicular to the lengthwise direction of the second current collector plate 121. In addition, the bead part 123 may have a greater thickness than the second current collector plate 121. In addition, the bead part 123 may be formed to have a width W2 in the range from approximately 1 µm to approximately 100 µm, preferably in the range from approximately 30 µm to approximately 40 µm. Here, it is quite difficult to make the width W2 of the bead part 123 smaller than approximately 1 µm due to characteristics of the manufacturing process. However, the width W2 of the bead part 123 can be controlled to be smaller than approximately 100 µm by adjusting the output capacity of the laser beam.

The second non-coating portion 124 is formed at opposite sides in the lengthwise direction of the second current collector plate 121. That is to say, the second non-coating portion 124 is positioned between the cut surface 121a and the second active material layer 122. The width W1 of the second non-coating portion 124 is in the range from approximately 0.1 mm to approximately 3 mm. Here, if the width W1 of the second non-coating portion 124 is smaller than 0.1 mm, a portion of the second current collector plate 121 having the active material layer 122 formed thereon may be fused by the laser beam when the cut surface 121a is formed by cutting the second current collector plate 121. In addition, if the width W1 of the second non-coating portion 124 is greater than 3 mm, suggesting that the active material has been excessively removed, the capacity of the secondary battery per unit area may become lowered.

In addition, the second non-coating portion 124 is further formed at one side perpendicular to the lengthwise direction of the second current collector plate 121, and a second electrode tab 125 is attached to the second non-coating portion 124. The second electrode tab 125 may be attached to the second non-coating portion 124 using an adhesive member 125a. In addition, the second non-coating portion 124 having the second electrode tab 125 attached thereto may be formed by removing a portion of the second active material layer 122 formed on the second current collector plate 121. Of course, the second non-coating portion 124 may also be formed by not coating the active material on the one side perpendicular to the lengthwise direction of the second current collector plate 121 when the second electrode plate 120 is formed. In this case, the second non-coating portion itself may serve as a second electrode tab.

The separator 130 positioned between the first electrode plate 110 and the second electrode plate 120 to prevent electrical shorts and to allow movement of lithium ions. The separator 130 may be made of polyethylene (PE), polypropylene (PP), or a copolymer of PE and PP.

The electrode assembly 100 is accommodated in the case 200 along with an electrolyte. The electrolyte may include an organic solvent, such as EC (ethylene carbonate), PC (propylene carbonate), DEC (diethyl carbonate), EMC (ethyl methyl carbonate), or DMC (dimethyl carbonate), and a lithium salt, such as lithium hexafluorophosphate ($LiPF_6$) or lithium tetrafluoroborate ($LiBF_4$). In addition, the electrolyte may be in a liquid, solid, or gel phase.

The case 200 is formed in a pouch type. The case 200 includes a first pouch 210 in which the electrode assembly 100 is received and a second pouch 220 combined with the first pouch 210. The case 200 is defined by the first pouch 210 and the second pouch 220 by bending a middle portion of an integrally formed hexahedral pouch film. In addition, the first pouch 210 includes a receiving groove 211, in which the electrode assembly 100 is to be received, formed therein by pressing, and a sealing part 212 for sealing the first pouch 210 with the second pouch 220. The sealing part 212 may be formed along one side, on which the first pouch 210 and the second pouch 220 are integrally brought into contact with each other, and the rest three sides. The case 200 includes two long sides on which the first pouch 210 and the second pouch 220 are brought into contact with each other, and two short sides perpendicular to the two long sides and facing each other. Here, the first electrode tab 115 and the second electrode tab 125 of the electrode assembly 100 are drawn out through one of the two short sides, which faces the other short side connected to the first pouch 210 and the second pouch 220 (?). Here, first and second insulation members 115b and 125b respectively formed in the first electrode tab 115 and the second electrode tab 125 are sealed to the sealing part 212. That is to say, the first and second insulation members 115b and 125b are formed at contact portions of the first and second electrode tabs 115 and 125 and the sealing part 212 to prevent the first and second electrode tabs 115 and 125 from being electrically shorted to the case 200.

While the present invention has been described that the electrode plates 110 and 120 formed by the aforementioned manufacturing method are applied to a pouch type secondary battery, the electrode plates 110 and 120 may also be applied to a prismatic secondary battery, a cylindrical secondary battery and/or a medium-/large-sized secondary battery module having a plurality of prismatic secondary batteries connected to each other. That is to say, the electrode plates 110 and 120 may be applied to various types of secondary batteries, and the invention is not limited to the types of secondary batteries disclosed herein.

Although the foregoing embodiments have been described to practice the method for manufacturing a secondary battery and the secondary battery using the same according to the present invention, these embodiments are set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

The invention claimed is:

1. A method for manufacturing a secondary battery, the method comprising:
    an active material layer forming step of forming an active material layer by coating an active material on both surfaces of a collector plate;
    an active material layer removing step of removing a part of the active material layer by irradiating a laser beam, from a first laser part positioned on both sides of the collector plate, to portions of the both surfaces of the collector plate; and
    a cutting step, separate and subsequent to the active material layer removing step, of cutting completely through the collector plate by irradiating a laser beam, from a second laser part separate from the first laser part, onto the portions of the collector plate from which the active material layer has been removed in the active material layer removing step.

2. The method of claim 1, wherein the laser beam irradiated in the active material layer removing step has a pulse width of 5 nsec to 100 nsec and peak power of 10 KW to 50 KW and is an infrared pulse laser having an output capacity of 20 W to 200 W.

3. The method of claim 1, wherein the laser beam irradiated in the cutting step is an infrared laser having an output capacity of 300 W to 1 KW.

4. A method for manufacturing a secondary battery, the method comprising:
    an active material layer forming step of forming an active material layer by coating an active material on both surfaces of a collector plate;
    an active material layer removing step of removing a part of the active material layer by irradiating a laser beam to portions of the both surfaces of the collector plate; and
    a cutting step of cutting the collector plate by irradiating a laser beam onto the portions of the collector plate from which the active material layer has been removed in the active material layer removing step,
    wherein a bead part having a circular or oval cross-section is formed on a cut surface of the current collector plate by fusing the current collector plate by the laser beam irradiated in the cutting step and cooling.

5. The method of claim 4, wherein the bead part has a width in the range from 1 μm to 100 μm.

6. The method of claim 4, wherein a non-coating portion of the current collector plate from which the active material layer has been removed is formed between the cut surface and the active material layer by the laser beam irradiated in the active material layer removing step, and the non-coating portion has a width of 0.1 mm to 3 mm.

7. A secondary battery comprising an electrode assembly and a case receiving the electrode assembly, wherein the electrode assembly includes an electrode plate, and the electrode plate includes a current collector plate, an active material layer formed by coating an active material on the current collector plate, and a non-coating portion formed at opposite ends in a lengthwise direction of the current collector plate, the non-coating portion from which the active material layer has been removed by a laser beam,
    wherein a bead part having a circular or oval cross-section is formed on a cut surface positioned on opposite ends of the current collector plate in a lengthwise direction by fusing the current collector plate by the laser beam and cooling.

8. The secondary battery of claim 7, wherein the bead part has a width in the range from 1 μm to 100 μm.

9. The secondary battery of claim 7, wherein the non-coating portion has a width of 0.1 mm to 3 mm.

* * * * *